No. 791,166. PATENTED MAY 30, 1905.
J. R. ROGERS.
LINOTYPE MACHINE.
APPLICATION FILED DEC. 24, 1904.
2 SHEETS—SHEET 1.
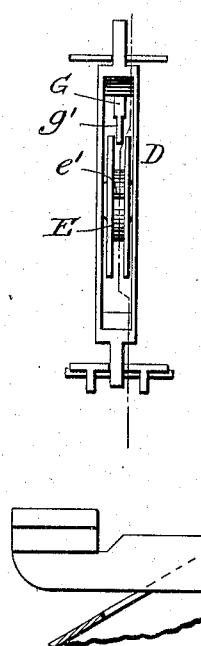
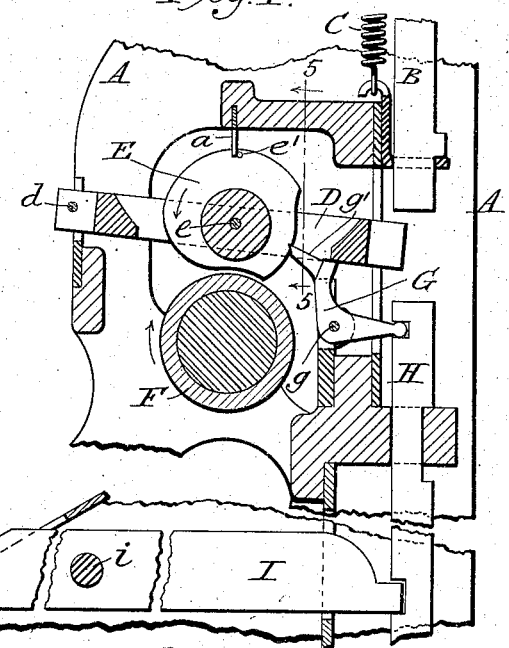
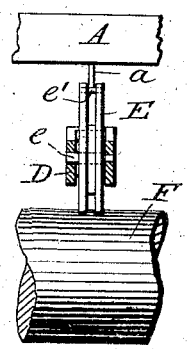
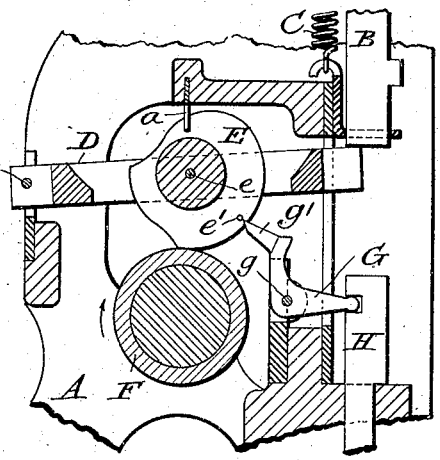
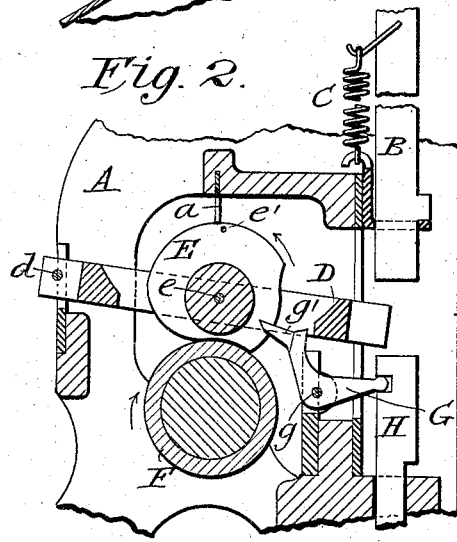
WITNESSES:
INVENTOR
J. R. Rogers
BY
P. T. Dodge
ATTORNEY No. 791,166. PATENTED MAY 30, 1905.
J. R. ROGERS.
LINOTYPE MACHINE.
APPLICATION FILED DEC. 24, 1904.

2 SHEETS—SHEET 2.

WITNESSES:
a. M. E. Kennedy.
F. S. Elmore

INVENTOR
J. R. Rogers
BY
P. T. Dodge
ATTORNEY

No. 791,166.

Patented May 30, 1905.

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINOTYPE-MACHINE.

SPECIFICATION forming part of Letters Patent No. 791,166, dated May 30, 1905.

Application filed December 24, 1904. Serial No. 238,186.

*To all whom it may concern:*

Be it known that I, JOHN R. ROGERS, of Brooklyn, county of Kings, and State of New York, have invented a new and useful Improvement in Linotype-Machines, of which the following is a specification.

My invention has reference to keyboard mechanism employed in the commercial Mergenthaler linotype-machine of the present day and described in United States Letters Patent No. 530,931, the aim of the invention being to render the mechanism more speedy and positive in action. This mechanism includes certain cams mounted in and serving to lift yokes which actuate the matrix-releasing devices, these yokes being normally supported in an operative position by underlying dogs, which should speedily resume their normal positions after being moved in order to arrest the descending yokes. In practice it is found that this does not always occur. My invention has in view the positive actuation of these dogs by means of a member of the mechanism moving at the proper time. I prefer to use either an arm on the yoke to act upon the dog or to have the dog acted upon by an adjacent cam.

With the exception of the parts herein specifically described the machine may be in all respects of ordinary construction.

The invention is of course applicable not only to linotype-machines, but to all kindred machines.

Two forms of the improvement are represented in the accompanying drawings.

Figure 10:
Figure 7:
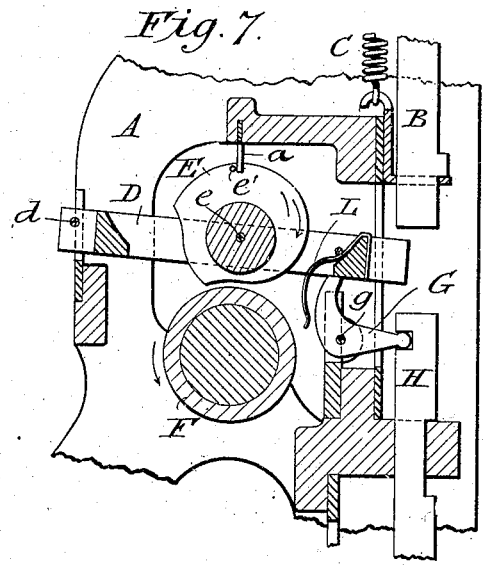
Figure 11:
Figure 8:
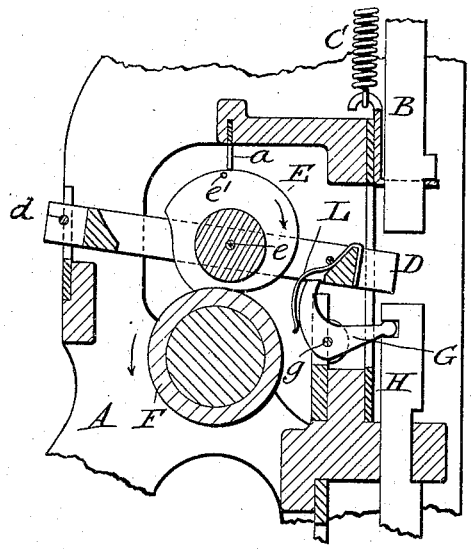
Figure 9:
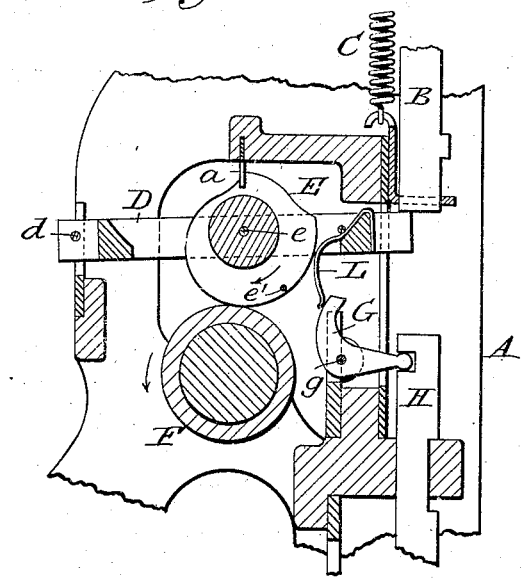

Figures 1, 2, and 3 represent vertical cross-sections through a keyboard mechanism with my improvement embodied therein, the respective figures representing the parts in different stages of their action. Fig. 4 is a top plan view of one of the cam-yokes and adjacent parts. Fig. 5 is a cross-section on the line 5 5, Fig. 1, looking in a forward direction. Fig. 6 is a perspective view of the yoke-supporting dog with an extension to be acted upon by the cam, as shown in the preceding figures. Figs. 7, 8, and 9 are sectional views through a modified or alternative construction, showing different stages of action, the dog being in these cases actuated by an arm on the yoke. Fig. 10 is a top plan view of the yoke with the cam and spring therein. Fig. 11 is a perspective view of the spring.

Referring to the drawings, A represents a rigid supporting-frame, and B one of the vertically-sliding reeds constantly urged downward by a spring C and requiring to be lifted in order to actuate a matrix-releasing device at the mouth of the magazine.

D is a slotted yoke or arm mounted in one end of the horizontal pivot $d$ and requiring to be raised at intervals for the purpose of lifting the reed B.

E is a cam mounted on a horizontal pivot $e$ in the yoke and lying above and normally out of contact with a horizontal rubber-covered roll F, which is extended across the keyboard beneath the entire series of cams and rotated constantly in the direction indicated by the arrow. The cam is grooved peripherally and provided with a transverse pin $e'$, which is engaged normally against the fixed stop-pin $a$ on the frame, as shown in Fig. 1, so as to prevent the cam from turning forward in the direction indicated by the arrow, as it tends to do by reason of the preponderance of weight on one side. The yoke is maintained normally in the position shown in Fig. 1 to hold the cam out of engagement with the driving-roll F and into engagement with the stop-pin $a$ by an angular dog G, mounted on the horizontal pivot $g$ in the frame. The dog G is in turn engaged by the upper end of a vertically-sliding bar H, the lower end of which engages the rear end of the finger-key I, pivoted at $i$.

When the key is actuated, the dog will be disengaged from the yoke, which is permitted to fall, so that the cam disengages from the stop-pin and rests upon the driving-roll F, as shown in Fig. 2, whereupon the rotation of the cam lifts the yoke above its original level, causing it in turn to lift the reed B, as shown in Fig. 3, and effect the discharge of a matrix. The continued rotation of the cam permits the yoke to fall; but it is arrested in its original position by the dog, which has in the meantime resumed its original position.

So far as described the parts are the same as in the ordinary commercial linotype-machine.

It sometimes happens that the dog will not assume the required position in time to arrest the descending yoke. To overcome this difficulty, I provide it with a finger or extension $g'$, lying in the path of the cam-pin $e'$, so that as the cam completes its rotary motion the pin $e'$ will act beneath the arm $g'$, as shown in Fig. 3, and thereby carry the dog positively to the required position beneath the end of the yoke.

Referring now to the alternative constructions shown in Figs. 7 to 11, the parts are all of the same construction and mode of action as those described above, except that the dog G is constructed in the usual form, without the arm or extension $g'$ above described. In place of this arm I employ a spring or arm L, pinned fast to the vibrating end of a yoke D in position to act upon the upper end of the dog G as the yoke descends from its highest position in the manner shown in Fig. 9, thereby compelling the upper end of the dog to resume its normal or operative position below the yoke, so that it will be certain to be arrested thereby. It will be observed that this arm is the mechanical equivalent of the projection on the dog G. (Illustrated in Fig. 1, &c.)

While the constructions herein shown are found to fully answer their purpose, it is to be understood that the details may be modified at will, provided only that a moving member of the mechanism is used to restore the dog to its normal position.

I believe my mechanism to be the first of its kind in which the reëngagement of the dog is effected positively by power-driven mechanism and without reliance, as heretofore, upon springs, which are unreliable and not positive in action.

Having described my invention, what I claim is—

1. In a keyboard mechanism of the type herein described, the combination of the movable cam-carrying yoke, a dog to sustain the same, and power-driven means for positively moving the dog to its engaging position.

2. In a keyboard mechanism of the type herein described, the combination of the movable cam-carrying yoke, the sustaining-dog, and means carried by the yoke to restore the dog to its normal position.

3. In a keyboard mechanism, the combination of the rising and falling yoke, its cam, the roll for actuating the cam, and the yoke-supporting dog constructed and arranged to be moved by the cam.

4. In a keyboard mechanism of the character herein described, the combination of the continuously-rotating roll, the cam to coöperate therewith, a vertically-movable yoke supporting said cam, a dog to sustain the yoke, and means receiving motion from said roll to restore the dog to its normal position.

In testimony whereof I hereunto set my hand, this 22d day of December, 1904, in the presence of two attesting witnesses.

JOHN R. ROGERS

Witnesses:
 DAVID S. KENNEELY,
 JACOB B. BUCKLEY.